UNITED STATES PATENT OFFICE.

HERMANN SCHULZE-BERGE, OF ROCHESTER, PENNSYLVANIA.

DECORATING GLASSWARE.

SPECIFICATION forming part of Letters Patent No. 418,234, dated December 31, 1889.

Application filed May 26, 1888. Serial No. 275,236. (No specimens.)

*To all whom it may concern:*

Be it known that I, HERMANN SCHULZE-BERGE, of Rochester, in the county of Beaver and State of Pennsylvania, have invented a new and useful Improvement in Decorating Glassware; and I do hereby declare the following to be a full, clear, and exact description thereof.

My invention relates to an improvement in decorating glassware by metallic colors; and it consists in an improved method of producing decorations with colors which penetrate the surface and enter into the body of the object from its surface.

It is well known that in glass-staining a beautiful transparent yellow color can be obtained by coating the glass object with a mixture of silver in its state as chloride, carbonate, oxide, nitrate, &c., in combination with ocher or clay, and a vehicle—such as molasses, honey, &c.—and baking or burning the object at a dull-red heat. This coating is applied as a thick heavy cover with brushes, and after baking or burning the object the crust of clay or ocher is removed and a transparent yellow color is found to have penetrated into the glass object. This process of staining glass, although it has long been well known, is not applicable to the production of delicate decorations composed in part or entirely of fine lines or pictures similar to wood-cuts, engravings, &c., in which covered and open spaces alternate upon a very small area. Owing to the nature of these staining-mixtures, containing as they do a considerable amount of clay or other bulky infusible material, the deposits made thereby form a heavy thick crust upon the article, and they are only applicable when mixed with semi-fluid vehicles. The clay or ocher forms an indispensable part in these staining-colors, and acts chemically as well as mechanically.

It is the object of this invention to adapt the various processes by which the coloring substance is caused to penetrate into the body of the glass to the purpose of producing even the finest and most delicate line-work decorations or marks. To obtain this result, I make use of the metallic combinations in the dry or pulverulent state, omitting, generally, the admixture of clay or its equivalent entirely, or applying the same afterward and on top of the pigments. The metallic combinations or pigments must be free from glaze or flux, so that they shall not form a fusible enamel upon the articles.

In carrying out my invention I produce a design upon the glass object, which is done most conveniently with a flexible elastic stamp in well-known ways—such, for instance, as described in Patent No. 296,223 or No. 316,836—using a semi-fluid sticky vehicle, like varnish or printing-ink, and then I apply the dry pulverulent metallic coloring substance without any glaze or flux and without admixture of clay or its equivalent to the design, rubbing it over the design with a cotton bunch or the like. I have found that a few of the coloring substances specified later on decompose easily in contact with glass and penetrate into the glass when heated to the proper heat, which is in most cases a dull-red heat from about 800° to 900° Fahrenheit. When the metallic part enters into the glass surface the color is produced directly. Such metallic pigments as specified later on do not need an admixture or cover of clay, ocher, &c., although such admixtures may be applied without injury. Other metallic pigments require, after burning, a further treatment in a reducing-atmosphere to produce their coloring action, and again others require the presence of clay, ocher, &c., while being heated or baked, in order to decompose the pigment and to cause the metallic color to enter into the object.

In case pigments are to be used requiring the presence of clay, ocher, coal, graphite, or of a salt capable of yielding an acid or yielding oxygen when heated, I generally apply such admixtures in a layer after the design has been provided with the pigment. This may be done in either of the following ways: After the design has been produced upon the object and after the dry pulverulent metallic substance or pigment has been applied the glass object is left standing for a short time until the printing-ink has permeated the pigment and is capable of absorbing more of the dry pulverulent substance. Then I apply the admixture by rubbing the pulverulent material over the design. This produces only a comparatively thin coating of admixing material, which is enough in some cases. To thicken it further, I let the article stand for some time—say a day—and then with an inking-roller I apply some printing-ink all over the design and over its interstices and apply the pulverulent admixing or covering material to the portions which are intended to be covered or coated. This operation may be repeated several times, it, however, being desirable that the printing-ink be perfectly combustible, leaving no fixed alkalies behind, nor anything to smear or spoil the free interstices of the design which it covers. Likewise the admixing or covering material applied all over the design and its interstices should be of such quality as to not act upon or interfere with the clear or open glass surfaces. Instead of applying the admixing material as described above it may be mixed with water or some other vehicle—such as glycerine, benzine, &c.—and this mixture may be applied all over the design and its interstices by a brush or by submerging the design on the object into the liquid. This, however, cannot be done if the water or other vehicle dissolves the pigment or printing-ink, as in such case it would cause the design to blur. It then is better to first slightly bake or char the design on the object and after cooling it off to apply the admixing or covering substance in any of the ways indicated above.

Most of the silver compositions at present used for staining—i. e., the chloride of silver, oxide of silver, nitrate of silver, carbonate of silver, and cyanide of silver—do not produce directly a yellow stain when heated with glass unless they are used in combination with clay or its equivalent. If applied to the design pure and in a dry pulverulent state, they produce, with the exception of the chloride of silver, after being burned with the glass object, a film of metallic silver. The chloride of silver is not affected chemically by this operation.

If the temperature in burning the object is high enough to melt the deposit upon the glass, the film of metallic silver is capable of receiving a bright polish; otherwise it wipes off, or it can be removed by a few drops of diluted acid, leaving the glass article perfectly clear as before and without any stain or color whatever. If this clear glass article is then heated in an open flame in the hearth of a furnace or in a heated atmosphere of hydrogen or natural gas, the design reappears even in its finest lines in a transparent yellow color. This process is applicable both to lime glass and to lead glass. In the latter case care should be taken not to expose the lead-glass objects too long to the reducing-atmosphere, as otherwise some of the lead contained in the glass may be reduced and may blacken the object. When the yellow stain appears on the clear glass, if it then be exposed to a strong heat—such as produced by the oxidizing-flame of a blast-lamp—the yellow-stained parts or lines assume in reflected light, after cooling, a mother-of-pearl-like or rainbow-colored appearance, and each projecting part or line of the design, no matter how fine or how broad, is lined with a bright narrow golden edge or border. To some degree this phenomenon depends on the quantity of silver which has entered into the glass. If a comparatively large amount has entered, the surface becomes more dim, like the white variations of mother-of-pearl, and eventually it becomes covered with a film of metallic silver. If a small amount of silver has entered into the object, it assumes an exceedingly bright polish; but the rainbow colors are comparatively faint. I have found it to give the most satisfactory results in this respect if dry pulverulent carbonate of silver is used on the design and if lime-glass articles are treated with it in the manner described.

If the various silver salts or the oxide are applied in a dry pulverulent state to the design on the object and then are covered with a layer of clay or ocher, they produce directly and without further treatment a yellow stain if heated to the proper temperature, and no film of metallic silver is deposited. They also produce directly a beautiful stain if the material of the admixing or protecting cover contains a salt—such as copperas—which yields sulphuric acid. If such sulphuric-acid salt be applied as a cover to selected portions of the design only, such portions of the design appear after burning or baking in deeper or stronger color. Thus decorations can be produced in which different parts of the design are made to contrast in color with other parts of the same design.

Metallic pigments, referred to above as producing the colored design in the body of the glassware directly without the admixture or cover of clay or its equivalent and without further treatment in a reducing-atmosphere, are the sulphate of silver and the phosphate of silver. The first one produces, when heated with glass objects to a dull-red heat, a rich transparent dark-yellow brown. The phosphate produces under the same circumstances a transparent yellow of a lighter shade. Both may be used on different parts of the same design to produce similar effects, as before mentioned. The phosphate of silver sometimes leaves, after burning, a thin deposit of metallic silver on parts of the design. Such film may be easily removed by a few drops of nitric acid.

The various silver compounds before mentioned as used for staining glassware which are not capable of producing directly a yellow stain, if applied by themselves in a dry pulverulent state, will, however, produce a yellow stain directly if mixed with dry pulverulent sulphate of silver, or if mixed with any other dry pulverulent substance yielding sulphuric acid when heated.

Besides the silver salts mentioned, there are several other metallic substances equally applicable for the purpose of producing colored decorations in the body of the glass object by my method, among others the oxides or salts of bismuth, of lead, and of copper. The copper salts, if applied to a design in a dry pulverulent state, can be treated by a method described in Patent No. 382,105. They produce, however, more or less, a flowing coloration, diffusing and spreading out over the lines of the design.

The lead salts or the lead oxide cannot be applied to decorations upon lead glass, but if applied according to my method in a dry and pulverulent state in a thin film and rubbed over the design they may be used to decorate or make marks upon lime-glass objects. The design is colorless after burning; but if it be then exposed to a hot reducing-atmosphere—such as the smoking flame of a lamp or a heated atmosphere of hydrogen, sulphureted hydrogen, natural gas, or the like—the design appears, developing in color through brown into black, and finally resulting in a deep black with an indigo-bluish tint, even the finest lines being clearly and sharply defined. If the atmosphere toward the end of the operation is partly oxidizing, or if the article while hot is exposed to the open air, slightly iridescent colors can be obtained on the surface of the decoration, which then has a bluish and purple hue.

Decorations to which dry pulverulent nitrate of bismuth has been applied, and which have been treated in the same manner as those provided with oxide of lead, produce the decoration after treatment in reducing-atmosphere of a deep-brown or brown-black coloration, which is capable of assuming strong iridescent colors having chiefly a dark-green hue.

Although in the foregoing specification I have dwelt chiefly upon the colors as produced by substances containing silver, lead, and bismuth, it is, however, evident that my invention is not limited to the substances enumerated, but that my improved method of producing colored decorations in the body of the glass object is applicable in part or entirely to any and all other processes by which a coloring substance is caused to penetrate the surface and enter into the body of the object in the shape of outlined configurations or decorations.

I claim as my invention—

1. The method hereinbefore described of coloring glassware with metallic pigments entering into the body of the object, consisting in producing a design upon the object with a sticky substance, applying dry pulverulent metallic pigments without flux to the design, and exposing the objects to a proper degree of heat, substantially as and for the purposes described.

2. The method hereinbefore described of coloring glassware with metallic pigments entering into the body of the object, consisting in producing a printed design upon the object with a sticky substance, applying dry pulverulent metallic pigments without flux to the design, exposing the object to the action of a proper degree of heat, and developing the color in the design by exposing the object to a reducing-atmosphere, substantially as and for the purposes described.

3. The method hereinbefore described of coloring glassware with metallic pigments entering into the body of the object, consisting in producing a printed design upon the object with a sticky substance, applying dry pulverulent metallic pigments without flux to the design, exposing the object to the action of a proper degree of heat, and developing the color in the design by exposing the object to a reducing-atmosphere and then to an oxidizing-atmosphere, substantially as and for the purposes described.

4. The method hereinbefore described of coloring glassware with silver pigments, consisting in producing a design upon the object with a sticky substance, applying the dry pulverulent silver pigment without flux to the design, and exposing the object to the action of a proper degree of heat, substantially as and for the purposes described.

In testimony whereof I have hereunto set my hand this 23d day of May, A. D. 1888.

HERMANN SCHULZE-BERGE.

Witnesses:
W. B. CORWIN,
THOMAS W. BAKEWELL.